United States Patent Office 2,960,391
Patented Nov. 15, 1960

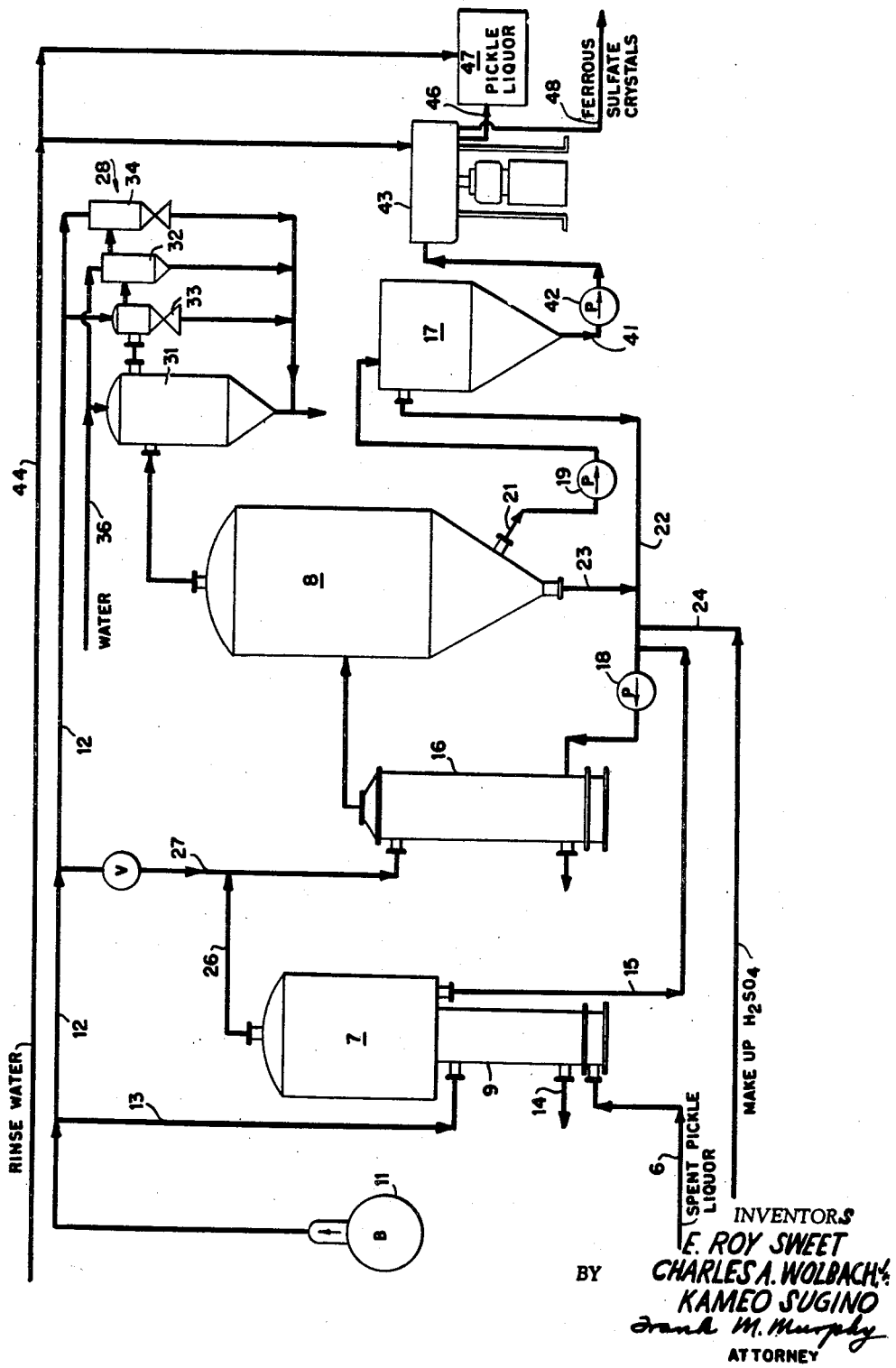

2,960,391

REGENERATION OF SPENT PICKLE LIQUOR

E Roy Sweet, Hillsdale, and Charles A. Wolbach, Jr., Red Bank, N.J., and Kameo Sugino, Brooklyn, N.Y., assignors to Singmaster & Breyer, Inc., a corporation of New York Filed Oct. 29, 1958, Ser. No. 770,400

6 Claims. (Cl. 23—296)

This invention relates to the treating of spent pickle liquor which consists essentially of an aqueous solution of sulfuric acid and ferrous sulfate. More particularly, it relates to regeneration of such liquor by concentration of the contained sulfuric acid and the consequent removal of ferrous sulfate therefrom.

In the pickling of iron or steel, metal which is coated with metal oxide is contacted with an aqueous solution of sulfuric acid and the acid and metal oxide interact and form ferrous sulfate. The effectiveness of the solution decreases as the acid strength decreases and below, for example, an acid strength of about 8% by weight, it is generally not economical to employ the solution for pickling. Accordingly, it has been proposed to treat the spent liquor to separate ferrous sulfate so that the acid concentration is increased and the liquor can be used again in the pickling process. In general, the regeneration of spent pickle liquor is accomplished by evaporation of water to cause precipitation of ferrous sulfate, and addition of sulfuric acid to make up for acid consumed in the formation of ferrous sulfate. A large number of methods involving these steps have been proposed and a few of these are practiced commercially. The invention provides a method of this type and the method of the invention has the advantage over heretofore known methods of being more economical.

It has been found that significant advantages in respect to heat economy and ferrous sulfate crystal form, are realized by evaporating water from the spent pickle liquor to a concentration of ferrous sulfate slightly less than the concentration at which ferrous sulfate would be precipitated from the liquor, adding to the resulting concentrated liquor fresh sulfuric acid to make up for acid consumed in the formation of ferrous sulfate, and thereafter evaporating additional water from the liquor to precipitate ferrous sulfate. The treatment can be carried out continuously in a multiple effect evaporation operation which includes two stages, the concentration to the point of incipient precipitation being effected in the first stage, the acid being added between the stages, and the final concentration and resultant precipitation being effected in the second stage. As is characteristic of multiple effect evaporation, the water vapor formed by evaporation in the first stage is used as heating steam in the second stage.

In general, the heat supplied to the second stage by steam from the first stage and heat of dilution due to the acid addition will provide the major proportion of the heat required in the second stage, and in some cases steam from the first stage and the heat of dilution provide all the heat required in the second stage. Utilization in the second stage of steam from the first stage and the heat of dilution makes possible the high heat economy characteristic of the method of the invention, and the effecting of the regeneration by evaporation of a relatively small amount of water.

The amount of fresh acid added intermediate the evaporation stages, in general and preferably is the amount required as make-up acid for the pickling operation. Preferably, the fresh acid is added continuously to the first stage effluent and immediately before this effluent is introduced into the second stage.

The ferrous sulfate is precipitated as the monohydrate and in consequence of localizing crystallization in the second stage, the preciiptate is in a form which can be conveniently separated from the mother liquor.

Employing multiple effect evaporation according to the invention, the first stage preferable includes only one effect and is operated at an elevated temperature and corresponding reduced pressure. The temperature can be about 150–190° F. and is preferably about 180° F. The extent of concentration in the first stage will depend on the particular liquor treated and can be readily determined by expediment to determine the point of incipient precipitation. Advantageously, the acid added to the concentrated liquor of the first stage can be 60° Bé. The second stage preferably includes only one evaporator which is arranged to function as a crystallizer unit. This unit is also operated at an elevated temperature and a corresponding reduced pressure and can be operated at about 100–145° F. and preferably about 135° F.

Suitable sub-atmospheric pressures to provide the desired boiling in the evaporators can be maintained by known means. Advantageously, however, this is done by means of a steam jet ejector connected to barometric condenser which in turn is connected to the second stage evaporator. Such operation provides scrubbing of the off-gas from the treating operation and hence reduces aerial pollution of the plant surroundings.

The use of temperatures of 150–190° F. and 100–145° F. in the first and second effects, respectively, is highly desirable as it permits handling of the various solutions at temperatures at which the corrosiveness of the solutions can be conveniently dealt with by suitable selection of equipment. Moreover, the use of the relatively low temperatures employed in the method of the invention is advantageous in that fuming is thereby significantly reduced.

The composition of spent pickle liquor is commonly about 5–15% by weight sulfuric acid and about 10–20% by weight ferrous sulfate, and liquor suitable for feed to a pickling operation is commonly about 15–30% by weight acid and up to about 5% by weight ferrous sulfate. In general, the acid strength of the regenerated liquor or second stage effluent will be substantially in excess of that desired for the pickling operation. Thus, the regenerated liquor can be about 40–50% by weight acid. The corresponding ferrous sulfate concentration is less than about 3–4% by weight. The regenerated liquor is conditioned for pickling by dilution and advantageously, this can be done with the weakly acid solution obtained by washing pickled metal with water and/or with water used to wash the ferrous sulfate precipitate. The use of wash water from the pickling operation is particularly advantageous as, when this water is employed for dilution of regenerated liquor, more dilute solution can be used for washing.

The invention will be further described with reference to the accompanying drawing wherein there is set forth a flow sheet for an embodiment of the invention.

Referring to the drawing, spent pickle liquor enters the plant through line 6 and is treated in a multiple effect evaporation operation which includes first effect 7 and second effect 8. The spent liquor is initially introduced into the first effect which can be a rubber lined steel unit provided with a vertical Karbate tube exchanger 9. Steam from the first effect is supplied by plant boiler 11 through steam header 12 and steam line 13. Steam condensate from the heat exchanger 9 discharges through line 14, and can be used as boiler feed water.

Evaporation in the first effect is limited so that no precipitation of ferrous sulfate crystals occurs and hence the formation of crystal nuclei which would cause excessively fine crystals in the second effect, and the fouling of heat exchanger surfaces in the first effect, is avoided.

The concentrated liquor resulting from the first effect evaporation is withdrawn through line 15 and passed to the second effect 8 which is a forced circulation, vertical tube, crystallizer unit provided with heat exchanger 16 and settler tank 17. Advantageously, the second effect heat exchanger can have Nionel tubes which are desirable because they have satisfactory resistance to abrasion and corrosion for the service. Other suitable materials of construction can, however, be used in this service.

Ferrous sulfate monohydrate is precipitated in the second effect and the slurry concentration in the second effect is limited to about 15–25% solids by circulating liquor between the evaporating zone of the evaporator 8 and a separating zone maintained in the settler 17. Liquor is withdrawn from the second effect evaporator 8 through line 21 provided with slurry circulation pump 19 and is passed to the settler tank 17 where a portion of the ferrous sulfate crystals are separated. A slurry depleted in ferrous sulfate crystals is withdrawn from the settler tank through line 22 and is returned to the evaporator by circulation pump 18. Slurry is directly circulated through the second effect 8 by means of line 23. Make-up acid is passed through line 24 and is introduced into slurry being circulated to the second effect. The combined circulation streams, the concentrated liquor from the first stage, and the make-up acid pass through pump 18 which forces the concentrated liquor through the heat exchanger 16 and on to the second effect 8.

Steam for the second effect exchanger 16 is drawn from the first effect 7 through line 26 and the balance of the steam required is drawn from steam header 12 through line 27. The steam from the first effect will in some cases be all that is required for the second effect. In some cases, however, it will be necessary to use additional steam. The steam from the first effect in general is at least the major proportion of steam for the second effect and is commonly in excess of about two-thirds of that required for the second effect.

A suitable reduced pressure is maintained on the second effect by means of a two stage barometric condenser 28 formed by condensers 31 and 32 and steam jets 33 and 34. Steam is supplied to the jets from header 12 and water is supplied to the condensers through line 36 and discharges through line 37. The use of a barometric condenser provides scrubbing so that the effluent gas from the multiple effect evaporation is cleaned up before being discharged.

The underflow from the settler tank 17 contains the regenerated liquor and the ferrous sulfate separated from the spent liquor. The underflow is withdrawn through line 41 and is pumped by transfer pump 42 to centrifugal separator 43. The separator 43 is a continuous solid bowl centrifuge equipped with wash sprays supplied with rinse water from line 44. The rinse water is from the pickling plant (not shown). Fresh water can be employed for washing instead of or in addition to the rinse water, and other types of solid-liquid separating equipment can be used in this service. For example, a continuous filter or a programmed batch perforate basket centrifuge can be used.

Regenerated liquor is withdrawn from the centrifuge through line 46 and flows to pickle liquor storage tank 47. Rinse water is introduced into the storage tank from line 44 to dilute the regenerated liquor to the extent necessary to obtain the desired solution strength for the pickling operation. Fresh water can be used instead of or in combination with the rinse water to effect the desired dilution.

Ferrous sulfate monohydrate crystals are withdrawn from the centrifugal separator 43 through line 48 and are discharged to waste or employed as by-product or in by-product production.

The following example will serve to further illustrate the invention.

*Example 1*

A spent pickle liquor containing about 8.5% by weight acid and about 13% by weight ferrous sulfate is regenerated in a plant according to the flowsheet of the drawing to provide, after suitable dilution, a pickle liquor containing 40% by weight acid and 3% by weight ferrous sulfate.

First effect evaporator is operated at 180° F. and 16.1 inches of Hg vacuum and the second effect is operated at 135° F. and 27.2 inches of Hg vacuum.

Spent pickle liquor at the rate of 77 g.p.m. is fed to the first effect where 14,500 pounds per hour of water vapor are evaporated and the liquor is concentrated to about 11.3% by weight acid which corresponds to the point of incipient precipitation of ferrous sulfate for the liquor treated at the conditions of evaporation in the first effect. In the second effect about 12,800 pounds per hour of water are evaporated and the slurry concentration of about 20% solids is maintained. Make-up acid in the amount of about 3,750 pounds per hour of 98% acid are added to the liquor circulated in the second effect and the liquor fed to the second effect from the first effect. Steam generated in the first effect is employed in the second effect, and, in combination with heat of dilution from the acid addition, provides all the heat required in the second effect.

About 25 g.p.m. of slurry are pumped as underflow from the settler tank receiving slurry from the second effect, and this underflow is treated in the centrifugal separator from which there is recovered about 24 g.p.m. of regenerated liquor of composition 43% by weight acid and 3.4% by weight ferrous sulfate, and about 7,535 pounds per hour of ferrous sulfate monohydrate. About 3 g.p.m. of rinse water are used for washing the crystals.

The regenerated liquor is diluted with rinse water and make-up fresh water to provide a pickle liquor of about 40% by weight sulfuric acid and 3.2% by weight ferrous sulfate.

*Example 2*

A spent pickle liquor containing about 10.4% by weight acid and about 14.2% by weight ferrous sulfate is regenerated in a plant according to the flow sheet of the drawing to provide, after suitable dilution, a pickle liquor containing 25% by weight acid and 3.2% by weight ferrous sulfate.

The first effect evaporator is operated at 180° F. and 16.1 inches of Hg vacuum and the second effect is operated at 135° F. and 27.2 inches of Hg vacuum.

Spent pickle liquor at the rate of 59 g.p.m. is fed to the first effect where 7500 pounds per hour of water vapor are evaporated and the liquor is concentrated to about 13.2% by weight acid which corresponds to the point of incipient precipitation of ferrous sulfate for the liquor treated at the conditions of evaporation in the first effect. In the second effect about 10,500 pounds per hour of water are evaporated and the slurry concentration of about 15% solids is maintained. Make-up acid in the amount of about 2500 pounds per hour of 60° Bé. acid are added to the liquor circulated in the second effect and the liquor fed to the second effect from the first effect. Steam generated in the first effect is employed in the second effect and in addition 3500 pounds of fresh steam are supplied.

About 25 g.p.m. of slurry are pumped as underflow from the settler tank receiving slurry from the second effect, and this underflow is treated in the centrifugal separator from which there is recovered about 20 g.p.m. of regenerated liquor of composition 41.7% by weight acid and 3.9% by weight ferrous sulfate, and about 4700 pounds per hour of ferrous sulfate monohydrate. About 2.5 g.p.m. of rinse water are used for washing the crystals.

The regenerated liquor is diluted with rinse water and make-up fresh water to provide a pickle liquor of about 25% by weight sulfuric acid and 3.2% by weight ferrous sulfate.

What is claimed is:

1. The method of treating spent pickle liquor comprising an aqueous solution of ferrous sulfate and sulfuric acid to concentrate the sulfuric acid and separate ferrous sulfate therefrom and thereby regenerate the liquor for use in pickling, which includes evaporating water from the spent pickle liquor to a concentration of ferrous sulfate slightly less than the concentration at which ferrous sulfate would be precipitated from the liquor and thus prevent precipitation of any ferrous sulfate and form a concentrated liquor, adding sulfuric acid to said concentrated liquor and thereafter evaporating water from the concentrated liquor causing ferrous sulfate to precipitate therefrom.

2. The method of treating spent pickle liquor comprising an aqueous solution of ferrous sulfate and sulfuric acid to concentrate the sulfuric acid and separate ferrous sulfate therefrom and thereby regenerate the liquor for use in pickling, which includes regenerating the spent liquor by steps including multiple effect evaporation including a first stage and a second stage, the spent liquor being subjected in the first stage to elevated temperature under reduced pressure to evaporate water therefrom to a concentration of ferrous sulfate slightly less than the concentration at which ferrous sulfate would be precipitated from the liquor and thus prevent precipitation of any ferrous sulfate and form a concentrated liquor, withdrawing the concentrated liquor from the first evaporation stage, adding sulfuric acid to the withdrawn concentrated liquor and thereafter subjecting the concentrated liquor to elevated temperature and reduced pressure in the second stage to evaporate water from the concentrated liquor and precipitate ferrous sulfate therefrom, water evaporated in said first stage being employed as steam for heating the concentrated liquor treated in the second stage.

3. The method of claim 2, the elevated temperature employed in said first stage being 150–190° F. and the elevated temperature employed in said second stage being 100–145° F.

4. The method of claim 3, the reduced pressures employed in said stages being maintained in part at least by a barometric condenser receiving water vapor evaporated in the second stage whereby water vapor from the second stage is scrubbed and acid is removed therefrom.

5. The method of treating spent pickle liquor comprising an aqueous solution of ferrous sulfate and sulfuric acid containing about 5–15% by weight sulfuric acid and about 10–20% by weight of ferrous sulfate to concentrate the sulfuric acid and separate ferrous sulfate therefrom and thereby regenerate the liquor for use in pickling, which includes regenerating the spent liquor by steps including multiple effect evaporation including a first stage operated at a temperature of 150–190° F. and corresponding reduced pressure and a second stage operated at a temperature of 100–145° F. and corresponding reduced pressure, subjecting the spent liquor to the temperature and pressure of the first stage to evaporate water therefrom to a concentration of ferrous sulfate slightly less than the concentration at which ferrous sulfate would be precipitated from the liquor and thus prevent precipitation of any ferrous sulfate and form a concentrated liquor, withdrawing the concentrated liquor from the first evaporation stage, adding sulfuric acid to the withdrawn concentrated liquor and thereafter subjecting the concentrated liquor to the temperature and pressure of the second stage to evaporate water from the concentrated liquor and precipitate ferrous sulfate therefrom, water evaporated in said first stage being employed as steam for heating the concentrated liquor treated in the second stage.

6. The method of claim 5, wherein the concentrated liquor in the second stage is circulated between an evaporating zone wherein it is subjected to the elevated temperature and reduced pressure of the second stage and a separating zone wherein precipitated ferrous sulfate is separated therefrom, and the concentration of precipitated ferrous sulfate in the evaporating zone is maintained in the range of 15–25% by weight ferrous sulfate, and the concentrated liquor treated in the second stage is further concentrated in the second stage to an acid concentration of 40–50% by weight sulfuric acid.

References Cited in the file of this patent

UNITED STATES PATENTS

| | | |
|---|---|---|
| 2,668,130 | Martin | Feb. 2, 1954 |
| 2,721,562 | Irvine | Oct. 25, 1955 |